United States Patent
Gangadhar et al.

(10) Patent No.: US 11,406,850 B2
(45) Date of Patent: Aug. 9, 2022

(54) COMPACT POWERED AIR PURIFYING RESPIRATOR WITH AUTO-CHANGE FILTER AND BUILT-IN END OF SERVICE LIFE INDICATOR

(71) Applicant: Honeywell International Inc., Morris Plains, NJ (US)

(72) Inventors: Durgam Gangadhar, Hyderabad (IN); Anitha Pulli, Hyderabad (IN); Praveen Kumar Palacharla, Hyderabad (IN); Anjaiah Tumu, Hyderabad (IN); PhaniKumar Kagithapu, Hyderabad (IN); Narasimha Jitendra, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 240 days.

(21) Appl. No.: 16/080,931

(22) PCT Filed: Mar. 8, 2017

(86) PCT No.: PCT/US2017/021375
§ 371 (c)(1),
(2) Date: Aug. 29, 2018

(87) PCT Pub. No.: WO2017/156137
PCT Pub. Date: Sep. 14, 2017

(65) Prior Publication Data
US 2019/0143154 A1  May 16, 2019

Related U.S. Application Data

(60) Provisional application No. 62/306,248, filed on Mar. 10, 2016.

(51) Int. Cl.
*A62B 18/08* (2006.01)
*A62B 18/00* (2006.01)
(Continued)

(52) U.S. Cl.
CPC .............. *A62B 18/088* (2013.01); *A62B 7/10* (2013.01); *A62B 18/006* (2013.01); *A62B 23/02* (2013.01);
(Continued)

(58) Field of Classification Search
CPC ... A62B 18/088; A62B 18/045; A62B 18/006; A62B 18/10; A62B 19/00; A62B 19/02;
(Continued)

(56) References Cited

U.S. PATENT DOCUMENTS 3,736,927 A * 6/1973 Misaqi ................. A62B 18/003
128/201.25
5,217,513 A * 6/1993 Armbruster ............ B01D 46/18
55/351

(Continued)

FOREIGN PATENT DOCUMENTS

| CN | 105077745 B * | 8/2015 | ............. A62B 23/02 |
| FR | 814229 A * | 3/1937 | ............. A62B 23/00 |
| WO | 2017156137 A1 | 9/2017 | |

OTHER PUBLICATIONS

Machine English Translation of CN105077745 provided by Espacenet (Year: 2015).*

(Continued)

*Primary Examiner* — Joseph D. Boecker
*Assistant Examiner* — Brian T Khong
(74) *Attorney, Agent, or Firm* — Alston & Bird LLP

(57) ABSTRACT

Embodiments relate generally to methods and systems for refreshing filter media within a respirator and indicating end of service life for the filter media. A respirator may include a rollable filter media configured to be refreshed by rolling the filter media onto a roller. A rolling mechanism may rotate the roller, allowing for a fresh section of filter media to be placed in the air path of the respirator. The rolling mecha- (Continued)

nism may be controlled automatically by a motor and/or manually.

19 Claims, 4 Drawing Sheets

(51) Int. Cl.
- *A62B 23/02* (2006.01)
- *A62B 7/10* (2006.01)
- *A62B 19/00* (2006.01)
- *B01D 46/88* (2022.01)
- *B01D 46/00* (2022.01)
- *B01D 46/16* (2006.01)

(52) U.S. Cl.
CPC .......... *A62B 19/00* (2013.01); *B01D 46/0086* (2013.01); *B01D 46/16* (2013.01); *B01D 46/88* (2022.01)

(58) Field of Classification Search
CPC ......... A62B 23/00; A62B 23/02; A62B 25/00; A62B 7/00; A62B 7/10; B01D 46/008; B01D 46/0057; B01D 46/0058; B01D 46/0072; B01D 46/0073; B01D 46/103; B01D 46/16; B01D 46/185; B01D 46/2411; B01D 46/2403; B01D 46/18; B01D 46/20; B01D 46/22; B01D 46/0086; B01D 35/143

See application file for complete search history.

(56) References Cited

U.S. PATENT DOCUMENTS

| | | | | |
|---|---|---|---|---|
| 6,152,998 | A * | 11/2000 | Taylor | B01D 46/18 55/354 |
| 2004/0083896 | A1 * | 5/2004 | Mihaylov | B01D 46/0086 96/414 |
| 2006/0048782 | A1 * | 3/2006 | Gossweiler | A62B 23/02 128/205.12 |
| 2006/0102006 | A1 * | 5/2006 | Powell | B01D 46/18 96/429 |
| 2007/0006557 | A1 * | 1/2007 | Wang | A62B 23/02 55/351 |
| 2007/0137491 | A1 * | 6/2007 | Attar | A62B 18/088 96/417 |
| 2008/0245364 | A1 * | 10/2008 | Patterson | A62B 18/10 128/201.25 |
| 2010/0294274 | A1 * | 11/2010 | Poirier | A62B 23/02 128/202.22 |
| 2011/0061527 | A1 * | 3/2011 | Sullivan | B01D 46/42 95/1 |
| 2011/0126713 | A1 * | 6/2011 | Legare | B01D 46/521 96/135 |
| 2014/0373719 | A1 * | 12/2014 | Spiegel | B01D 46/0038 96/222 |
| 2016/0131094 | A1 * | 5/2016 | Pereira Madeira | B01D 46/0005 96/414 |
| 2017/0050056 | A1 * | 2/2017 | Xu | A62B 18/025 |

OTHER PUBLICATIONS

Machine English Translation of FR814229 provided by Espacenet (Year: 1937).*

International Application No. PCT/US2017/021375, International Search Report, dated May 9, 2017, 3 pages.

International Application No. PCT/US2017/021375, Written Opinion of the International Searching Authority, dated May 9, 2017, 5 pages.

* cited by examiner

COMPACT POWERED AIR PURIFYING RESPIRATOR WITH AUTO-CHANGE FILTER AND BUILT-IN END OF SERVICE LIFE INDICATOR

CROSS-REFERENCE TO RELATED APPLICATIONS

The present application is tit Stage of International Application No. PCT/US2017/021375 entitled "Compact Powered Air Purifying Respirator With Auto-Change r And Built-In End Of Service Life indicator" tiled Mar. 8, 2017, and which claims priority to U.S. Provisional Patent Application No. 62/306,248 entitled "Compact Powered Air Purifying Respirator With Auto-Change Filter And Built-In End Of Service Life Indicator" filed Mar. 10, 2016, such that the present application claims priority to both listed related applications, both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Powered air purifying respirators (PAPRs) utilize a mechanism, such as a blower, impeller, fan or other mechanism, to draw ambient air through air purifying elements to remove contaminants from the air. PAPRs are designed to be human portable for use in atmospheres with solid and liquid contaminants, gases, and/or vapors to provide a useable and safe supply of breathable air where the concentrations of contaminants are not immediately dangerous to life or health and the atmosphere contains adequate oxygen to support life. PAPRs carry a self-contained power source, such as a battery, to energize a motor to drive the blower, impeller, or fan. The self-contained power source desirably is sized small enough so the PAPR is readily human portable and large enough that the PAPR can be used without recharging the power source for a portion of a work shift effective to promote efficient worker operation.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
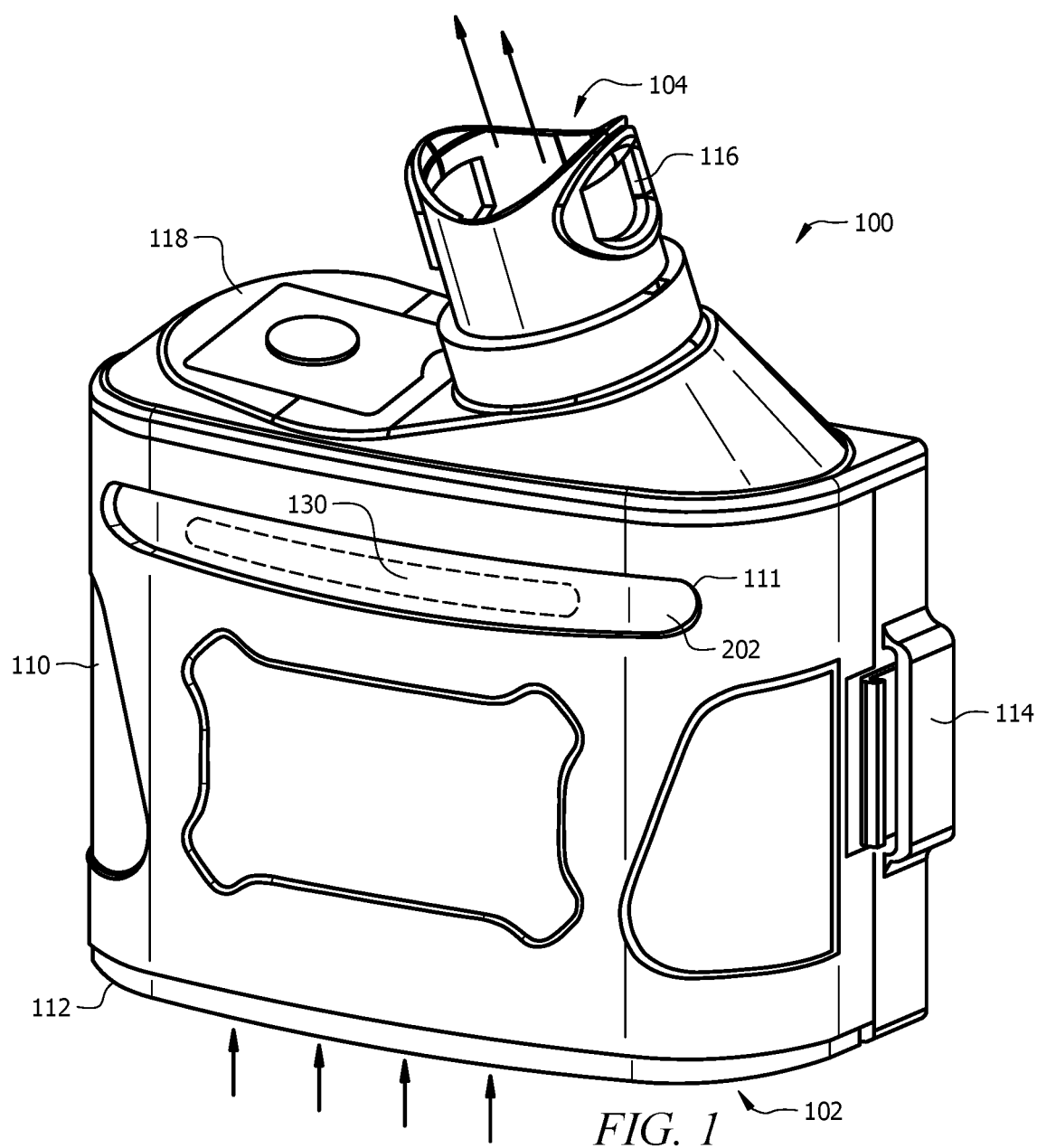
FIG. 1 illustrates a PAPR according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for refreshing filter media within a power air purifying respirator (PAPR) and indicating end of service life for the filter media. Current filters used with PAPRs may be very large in order to provide a sufficient amount of filtering time. This leads to an increase in blower size and power needed to run the PAPR. Additionally, over the life of the filter, the breathing resistance will increase as the filter media within the filter is used up or clogged. Before the filter is actually used up, the breathing resistance may become uncomfortable for a user. Additionally, some filters do not have any way of indicating end of service life for the filter and allow for incidents when a user may be exposed to contaminated air.

Disclosed herein are systems using rollable filter media within a PAPR 100. This may allow for the use of a thin sheet of filter media, maintaining desired breathing resistance across the filter media. Additionally, the use time for the filter media may be controlled by provided rolled filter media that may be rotated to a fresh section of filter media when the first section has been used up. Also, using thin filter media 202 may allow for decreased thickness of the PAPR 100 from the filter media, as well as the blower and other elements of the PAPR 100.

Referring now to FIG. 1, a PAPR 100 is shown wherein the PAPR comprises an air inlet 102 and an air outlet 104. The air outlet 104 may be configured to attach to a hose or other airway providing filtered breathable air to a user. In some embodiments, the outlet 104 may comprise an adapter 116 configured to attach to a hose and then a hood or mask worn by the user, wherein the PAPR 100 provides filtered air to the hood or mask. In some embodiments, the PAPR 100 may comprise a filter enclosure 110 and filter media located within the filter enclosure 110.

In some embodiments, the PAPR 100 may comprise a base 112 configured to attach to the filter enclosure 110. In some embodiments, the base 112 may be removable from the filter enclosure 110. In some embodiments, the PAPR 100 may comprise a housing 114 configured to enclose one or more elements of the PAPR 100, wherein the filter enclosure 110 may connect to the housing 114. In some embodiments, the filter enclosure 110 may be removable from the housing 114.

In some embodiments, the PAPR 100 may comprise a user interface 118, wherein the user interface 118 may comprise one or more buttons, one or more displays, and/or one or more indicators. The user may interact with the PAPR 100 via the user interface 118.

In some embodiments, the PAPR 100 may comprise a window 111 configured to display a portion of the internal components of the respirator. In some embodiments, the window 11 may display or show a portion of the filter media 202 (described below). In some embodiments, the filter media may comprise an end of service life indicator 130 printed or otherwise attached to the filter media 202, wherein the end of service life indicator 130 may be located near the end of the filter media 202, therefore indicating when the filter media 202 is almost used up.

Figure 2:
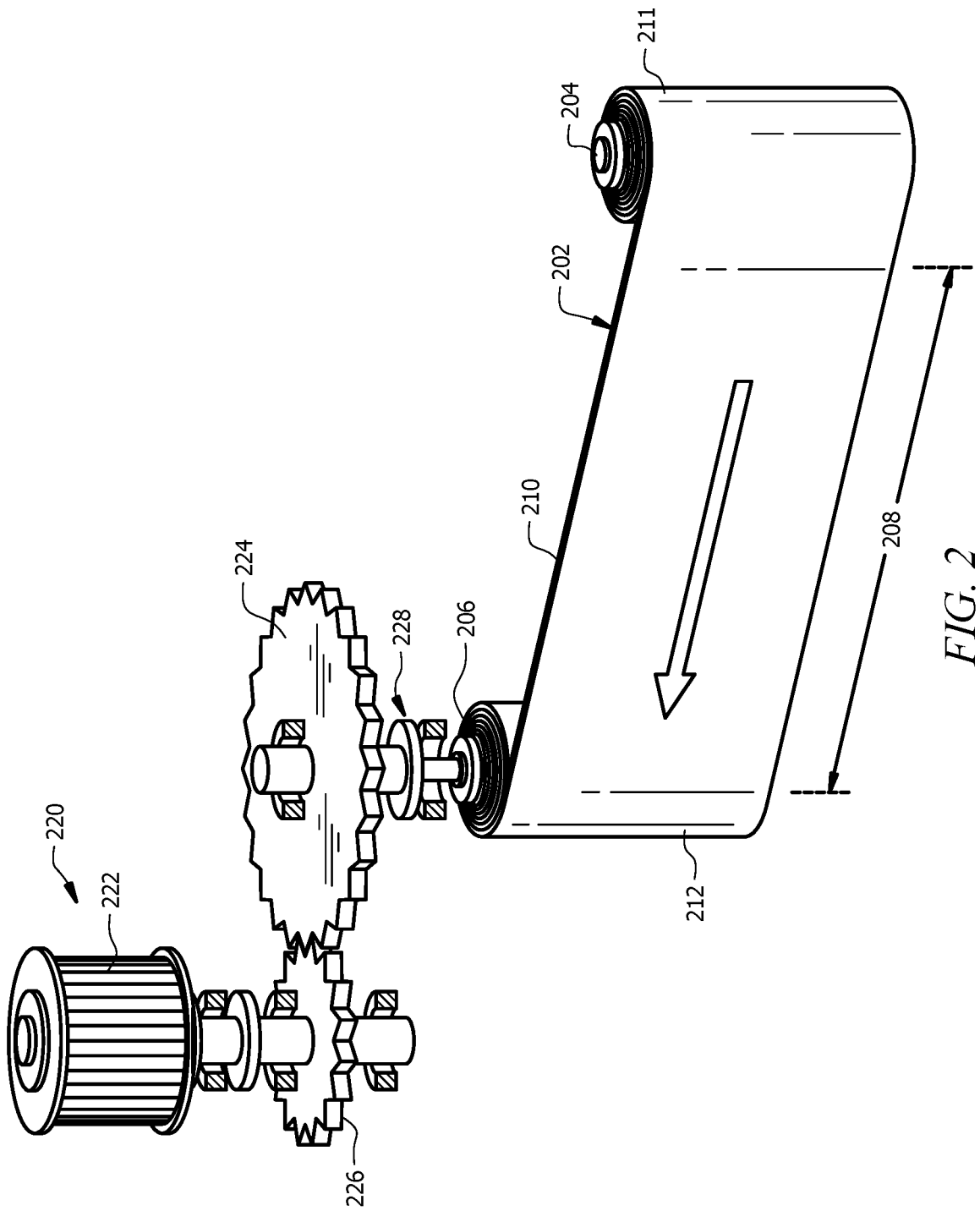
FIG. 2 illustrates a filter media and rolling mechanism according to an embodiment of the disclosure.

Referring now to FIG. 2, an exemplary embodiment of a rollable filter media 202 is shown. The filter media may comprise a nonwoven, woven, paper, or any other suitable medium with or without coating or impregnation. Different filter media may be used individually or in combination to filter out or absorb particulates and gases. The rollable filter media 202 may be located within a filter enclosure 110 (shown in FIG. 1). The rollable filter media 202 may comprise a thin sheet of material. Using thin filter media 202 may allow for decreased thickness of the PAPR 100. The rollable filter media 202 may be held on two rollers 204 and 206, and may comprise a section 208 between the two rollers 204 and 206, wherein the air flow through the filter media 202 may pass through this section 208. In some embodiments, at least one roller 206 may be connected to a rolling mechanism 220. In some embodiments, the rolling mechanism 220 may comprise a motor 222 and/or gear assembly 224, 226. In some embodiments, the rolling mechanism 220 may comprise a coupling 228 with at least one of the rollers 206. The rolling mechanism 220 may be configured to rotate the roller 206, thereby pulling the filter media 202 in the direction shown by the arrow 210 by wrapping the filter media 202 about the roller 206. In some embodiments, the filter media 202 may be rolled when the section 208 of filter media 202 has been used up or has reached end of service life. Then, the roller 206 may hold the used filter media 212, and the roller 204 may hold the fresh or unused filter media 211. In an alternative embodiment, the filter media could be rolled in the opposite direction, from roller 206 to roller 204. When the rolling mechanism 220 is activated, the rolling mechanism 220 may rotate the roller 206 a set number of rotations. In some embodiments, the number of rotations may change based on how much filter material has been rolled onto the roller 206.

In some embodiments, a controller of the PAPR 100 may automatically activate the rolling mechanism 220 at set time intervals. These time intervals may be set based on testing of the filter media to determine the time it takes to use up the filter media 202. In some embodiments, a controller of the PAPR 100 may automatically activate the rolling mechanism 220 when the controller determines that the currently used filter media is clogged or used up. This may occur when sensors within the PAPR 100 determine that the pressure, air flow, or other air quality indicates that the filter media is used up. In some embodiments, a controller of the PAPR 100 may automatically activate the rolling mechanism when a user presses a button on the PAPR 100. In some embodiments, the filter media 202 may comprise an end of service life indicator printed on the surface of the filter media (near the end of the filter media), and the filter enclosure may comprise a window allowing a user to view the end of service life indicator.

Figure 3:
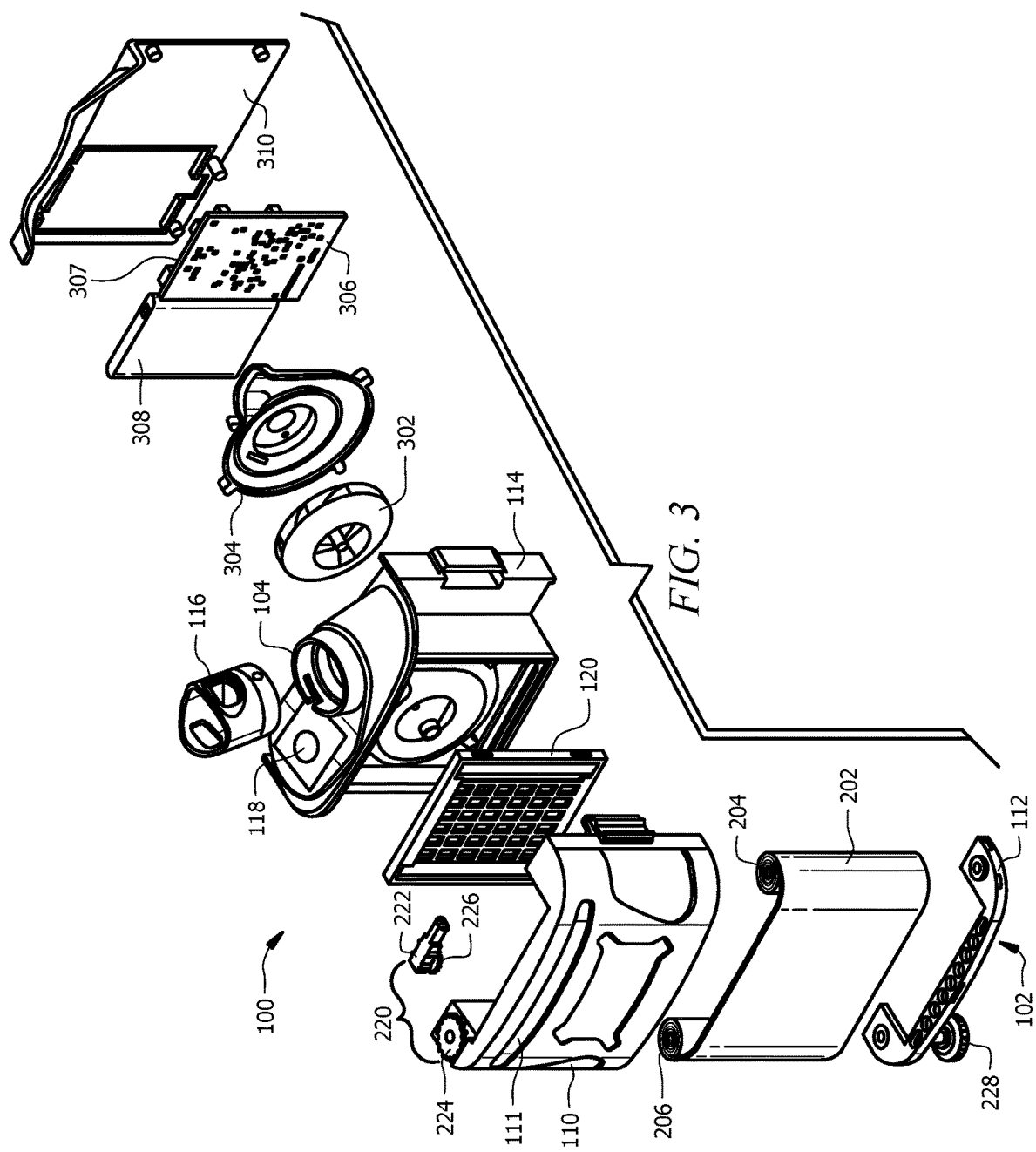
FIG. 3 illustrates an exploded view of a PAPR according to an embodiment of the disclosure.

Referring now to FIG. 3, an exploded view of the PAPR 100 is shown. As described above, the PAPR 100 may comprise an inlet 102, wherein the inlet 102 may comprise openings in a filter enclosure base 112. The filter enclosure base 112 may fit onto the filter enclosure 110, enclosing the filter media 202. In some embodiments, the rollers 204 and 206 holding the filter media may fit into portions of the filter enclosure 110 and/or base 112. Additionally, the filter enclosure may attach to a rolling mechanism 220 (as described in FIG. 2) comprising a motor 222, and gears 224 and 226. In some embodiments, the gear 224 may couple with the roller 206 through an opening in the filter enclosure 110. In the embodiment shown in FIG. 3, the rolling mechanism 220 may be located on the top of the filter enclosure 110, but in other embodiments, the rolling mechanism 220 may be located on the bottom or sides of the filter enclosure 110. In some embodiments, the PAPR 100 may also comprise a knob 228, wherein the knob 228 may be used to manually rotate the roller 206 to supply fresh filter media 202.

In some embodiments, the PAPR 100 may comprise an end of service life indicator (ESLI) 130, as shown in FIG. 1. In some embodiments, an ESLI 130 may be printed onto the surface of the filter media 202 near or at the end of the filter media 202. Additionally, the filter enclosure may comprise a window 111 allowing a user to view the printed surface of the filter media 202. In some embodiments, the ESLI 130 may comprise words stating that the filter media has reached (or is near reaching) end of service life. In some embodiment, the ESLI 130 may include an estimate for the service time left for the filter media. In some embodiments, the ESLI 130 may comprise a color, image, text, shape, or any other indicating item. In some embodiments, the filter enclosure 110 may be removable from the housing 114, and the base 112 may be removable from the filter enclosure 110, allowing a user to replace the used filter media 202.

In some embodiments, the filter enclosure 110 may fit into a housing 114. In some embodiments, the rolling mechanism 220 may be enclosed by the housing 114. In some embodiments, the PAPR 100 may comprise a filter support 120 placed against the filter media 202, wherein the filter media 202 may be located between the filter enclosure 110 and the filter support 120. The filter support 120 may comprise openings allowing air to flow through the filter media 202 and filter support 120 into the housing 114. The filter support 120 may define the area of the filter media 202 that is currently being used to filter the air passing through the PAPR 100.

In some embodiments, the PAPR 100 may comprise powered elements for drawing air into the PAPR 100 and pushing filtered air out of the PAPR 100. For example, the PAPR 100 may comprise an impeller assembly 302 and impeller enclosure 304, wherein the impeller enclosure 304 directs the air from the impeller to the outlet 104. In some embodiments, the PAPR may comprise a controller 306, which may comprise printed circuit board (PCB). The PCB 306 may be configured to control the operation of the elements of the PAPR 100. In some embodiments, the PCB 306 may comprise a controller for activating the rolling mechanism 220. In some embodiments, the PCB 306 may comprise (or be in communication with) one or more sensors 307 configured to detect qualities of the air that passes through the PAPR 100. The PCB 306 may use the information from the sensors 307 to determine when the filter media 202 should be refreshed. In some embodiments, the PAPR 100 may comprise a power source or battery 308, configured to power the elements of the PAPR 100, such as the PCB 306, the impeller assembly 302 and the rolling mechanism 220.

In some embodiments, the PAPR 100 may also comprise a back cover 310 configured to fit onto the housing 114 and enclose one or more of the elements of the PAPR 100. In some embodiments, the back cover 310 may comprise an opening for access to the battery 308, so that the battery may be replaced as necessary.

Figure 4:
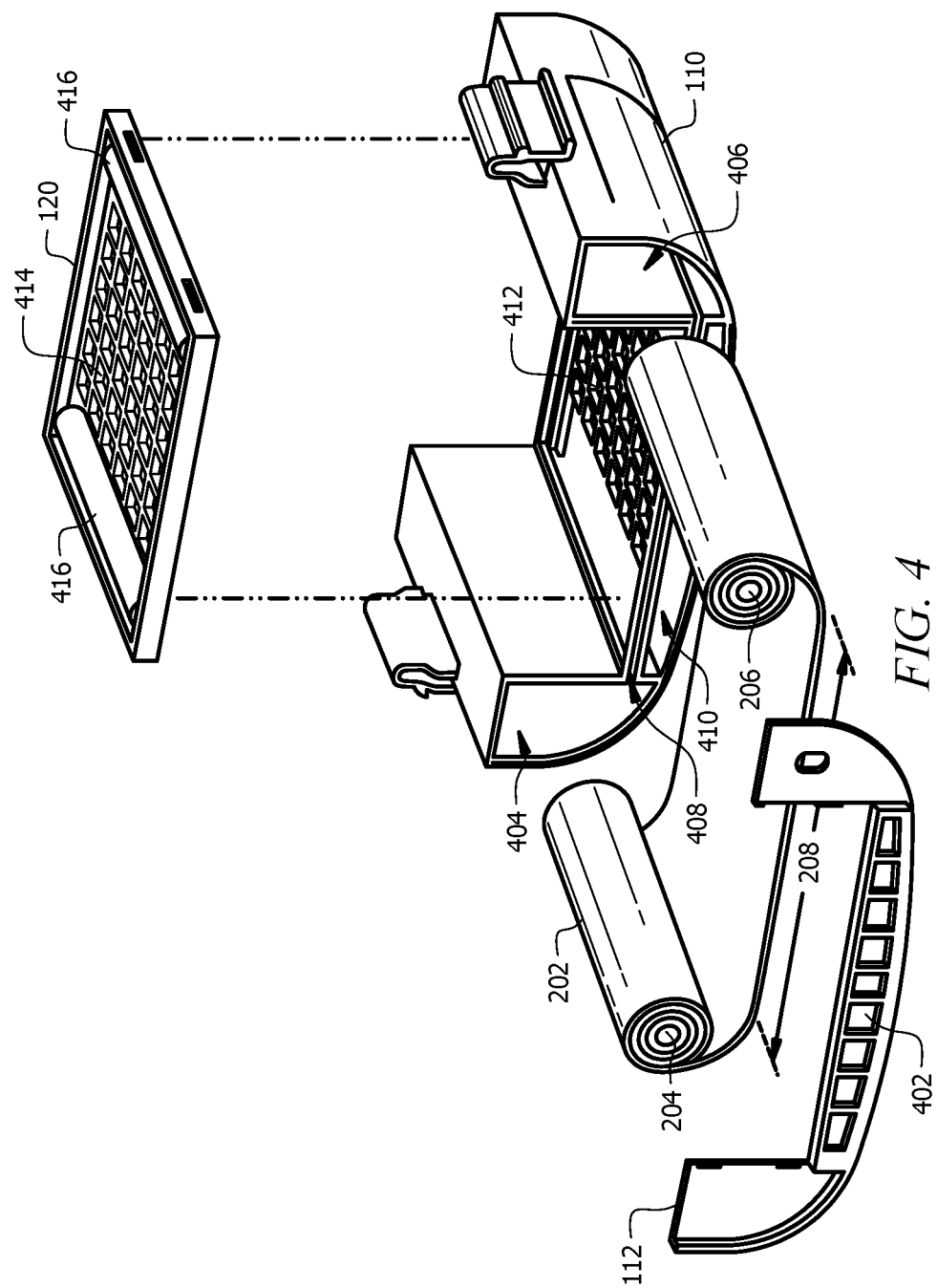
FIG. 4 illustrates an exploded view of a filter media and filter enclosure according to an embodiment of the disclosure.

Referring to FIG. 4, an exploded view of the filter media 202, filter enclosure 110, base 112 and filter support 120. The filter media 202 may fit into the filter enclosure, wherein the rollers 204 and 206 and the filter media wrapped around the rollers 204 and 206 may fit into cavities 404 and 406 of the filter enclosure. The section 208 of the filter media 202 may fit into a slot 408 of the filter enclosure 110, wherein the section 208 of filter media 202 may be located over openings 412 in the filter enclosure. The openings 412 may define the air path through the section 208 of the filter media 202. Additionally, the base 112 may comprise openings 402 defining the air path into a section 410 of the filter enclosure 110. The air may flow into the filter enclosure via the openings 402 in the base 112, and then into the section 410. From this section 410, the air may flow through the openings 412 of the filter enclosure 110 and therefore through the section 208 of the filter media 202.

The filter support 120 may fit into the filter enclosure 110 and contact the section 208 of the filter media 202. Once the air flows through the openings 412 and through the filter media 202, the air may flow through the openings 414 of the filter support 120. In some embodiments, the filter support 120 may comprise one or more rollers 416 configured to contact the surface of the filter media 202 and rotate when the filter media 202 is moved by the rolling mechanism (described above).

Embodiments of the disclosure may comprise a PAPR comprising a filter media configured to filter harmful substances from the air passing through the PAPR, wherein the filter media comprises a thin sheet of filter media; a filter enclosure configured to enclose the filter media and define an air path through a section of the filter media, wherein the air passing through the PAPR may only pass through the filter media that is within the air path; one or more rollers, wherein the filter media is attached to the one or more rollers and collected about the one or more rollers; a rolling mechanism coupled to at least one roller and configured to rotate the roller, thereby collecting the filter media onto that roller and moving a new portion of the filter media into the air path defined by the filter enclosure; and a controller configured to activate the rolling mechanism.

In some embodiments, the rolling mechanism comprises a motor assembly. In some embodiments, the controller automatically activates the rolling mechanism at set time intervals. In some embodiments, the controller automatically activates the rolling mechanism when the controller determines that the currently used filter media is clogged or used up. In some embodiments, the controller automatically activates the rolling mechanism when a user presses a button on the PAPR. In some embodiments, the rolling mechanism comprises a knob that can be manually controlled by the user. In some embodiments, the filter media comprises an end of service life indicator printed on the surface of the filter media, and wherein the filter enclosure comprises a window allowing a user to view the end of service life indicator.

In some embodiments, the filter media is located near the inlet of the PAPR. In some embodiments, the PAPR further comprises an impeller assembly. In some embodiments, the PAPR further comprises a PCB and a power source. In some embodiments, the PAPR further comprises a filter support configured to fit into a section of the filter enclosure and contact the filter media. In some embodiments, the filter support comprises one or more rollers configured to contact the surface of the filter media and rotate when the filter media is moved by the rolling mechanism.

Additional embodiments of the disclosure may comprise a respirator comprising a filter media configured to filter harmful substances from the air passing through the respirator, wherein the filter media comprises a thin sheet of filter media; a filter enclosure configured to enclose the filter media and define an air path through a section of the filter media, wherein the air passing through the respirator may only pass through the filter media that is within the air path; one or more rollers, wherein the filter media is attached to the one or more rollers and collected about the one or more rollers; a rolling mechanism coupled to at least one roller and configured to rotate the roller, thereby collecting the filter media onto that roller and moving a new portion of the filter media into the air path defined by the filter enclosure; and a controller configured to activate the rolling mechanism.

In some embodiments, the controller automatically activates the rolling mechanism at set time intervals. In some embodiments, the controller automatically activates the rolling mechanism when the controller determines that the currently used filter media is clogged or used up. In some embodiments, the respirator further comprises sensors configured to detect qualities of the air flow through the respirator. In some embodiments, the controller automatically activates the rolling mechanism when a user presses a button on the respirator. In some embodiments, the rolling mechanism comprises a knob that can be manually controlled by the user. In some embodiments, the filter media comprises an end of service life indicator printed on the surface of the filter media, and wherein the filter enclosure comprises a window allowing a user to view the end of service life indicator. In some embodiments, the filter media is located near the inlet of the PAPR. In some embodiments, the respirator further comprises an impeller assembly. In some embodiments, the respirator further comprises a PCB and a power source. In some embodiments, the respirator further comprises a filter support configured to fit into a section of the filter enclosure and contact the filter media. In some embodiments, the filter support comprises one or more rollers configured to contact the surface of the filter media and rotate when the filter media is moved by the rolling mechanism.

Other embodiments of the disclosure may comprise a method for refreshing the filter media within a respirator comprising determining that the filter media should be refreshed; activating a rolling mechanism coupled to a roller, wherein the roller is attached to the filter media; and rolling the filter media a number of rotations to move a new section of filter media into the air path of the respirator.

In some embodiments, determining that the filter media should be refreshed comprises monitoring time intervals during the use of the respirator. In some embodiments, determining that the filter media should be refreshed comprises sensing qualities of the air in the respirator indicating that the filter media is clogged or used up. In some embodiments, the method may further comprise indicating the end of service life of the filter media by printing an end of service life indicator on the surface of the filter media near the end of the filter media, and providing a window in the respirator for viewing the end of service life indicator.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable powered air purifying respirator (PAPR) comprising:
   a housing having an air outlet,
   a filter media configured to filter air passing through the PAPR to provide filtered, breathable air to a user;
   a filter enclosure configured to attach to the housing, enclose the filter media, and define an air path through a section of the filter media, wherein the air passing through the PAPR only passes through the section of the filter media that is within the air path;
   a first roller and a second roller, wherein the filter media is attached to and collected about each of the first roller and the second roller, the section of the filter media within the air path disposed between the first roller and the second roller, wherein the first roller and the second roller are fit into cavities of the filter enclosure;
   a base removably attached onto the filter enclosure, wherein a portion of the base is configured to enclose the first roller and the second roller, and wherein the base comprises a plurality of openings defining an air inlet;
   a motor coupled to one of the first roller and the second roller and configured to rotate the one of the first roller and the second roller to collect the filter media onto the one of the first roller and the second roller and to move a new portion of the filter media into the air path defined by the filter enclosure; and
   at least one sensor to determine air quality information of the air passing through the filter media; and
   a controller, communicatively coupled to the at least one sensor, configured to activate the motor based at least upon the air quality information received from the at least one sensor, and
   wherein the air outlet is in communication with the air path and the air outlet is configured to attach to a hose such that the filtered breathable air is disseminated through the air outlet to the user via the hose.

2. The PAPR of claim 1, further comprising at least one gear coupled to the one of the first roller and the second roller.

3. The PAPR of claim 2, wherein the controller is configured to automatically activate the motor at set time intervals.

4. The PAPR of claim 2, wherein the controller is configured to activate the motor when the user presses a button on the PAPR.

5. The PAPR of claim 1, further comprising a knob that can be manually controlled by the user.

6. The PAPR of claim 1, wherein the filter media comprises an end of service life indicator printed on a surface of the filter media, and wherein the filter enclosure comprises a window allowing the user to view the end of service life indicator.

7. The PAPR of claim 1, further comprising a filter support configured to fit into a section of the filter enclosure and contact the filter media.

8. The PAPR of claim 1, further comprising an impeller assembly.

9. The PAPR of claim 8, further comprising an impeller enclosure, wherein the impeller enclosure directs the filtered breathable air from the impeller assembly to the air outlet.

10. The PAPR of claim 1, further comprising a printed circuit board and a power source.

11. The PAPR of claim 10, wherein the power source is a replaceable battery.

12. The PAPR of claim 1, further comprising a filter support, the filter support comprising the first roller and the second roller configured to contact a surface of the filter media and rotate when the filter media is moved by the motor.

13. The PAPR of claim 1, wherein the filter enclosure is removably attached to the housing.

14. The PAPR of claim 1, wherein the one of the first roller and the second roller is rotated by a set number of rotations, wherein the number of rotations is determined based on the filter media that has been rolled onto the one of the first roller and the second roller.

15. A method for refreshing a filter media within a portable air purifying respirator (PAPR) comprising:
sensing, by at least one sensor, air quality information of the air that passes through the filter media;
receiving by a controller, communicatively coupled to the at least one sensor, the air quality information;
programmatically determining, based at least upon the air quality information received from the at least one sensor, that a section of filter media has reached an end of service life, wherein the section of filter media is located in an air path of the PAPR;
activating, by the controller, a motor coupled to a first roller, wherein the section of filter media is attached to and collected about each of the first roller and a second roller, the section of filter media within the air path disposed between the first and second rollers; and
rolling, by the controller, the filter media a number of rotations to move a new section of filter media into the air path of the PAPR.

16. The method of claim 15, further comprising monitoring time intervals during use of the PAPR to determine time required to reach the end of service life.

17. The method of claim 15, further comprising indicating an end of service life of the filter media by printing an end of service life indicator on a surface of the filter media, and providing a window in the PAPR for viewing the end of service life indicator.

18. The method of claim 15, further comprising passing ambient air into the air path of the PAPR via an inlet of the PAPR, and filtering the ambient air via the filter media to provide filtered, breathable air to a user.

19. The method of claim 15, wherein rolling the filter media by the number of rotations is determined based on the filter media that has been rolled onto the first roller.

* * * * *